United States Patent Office 3,541,880
Patented Nov. 24, 1970

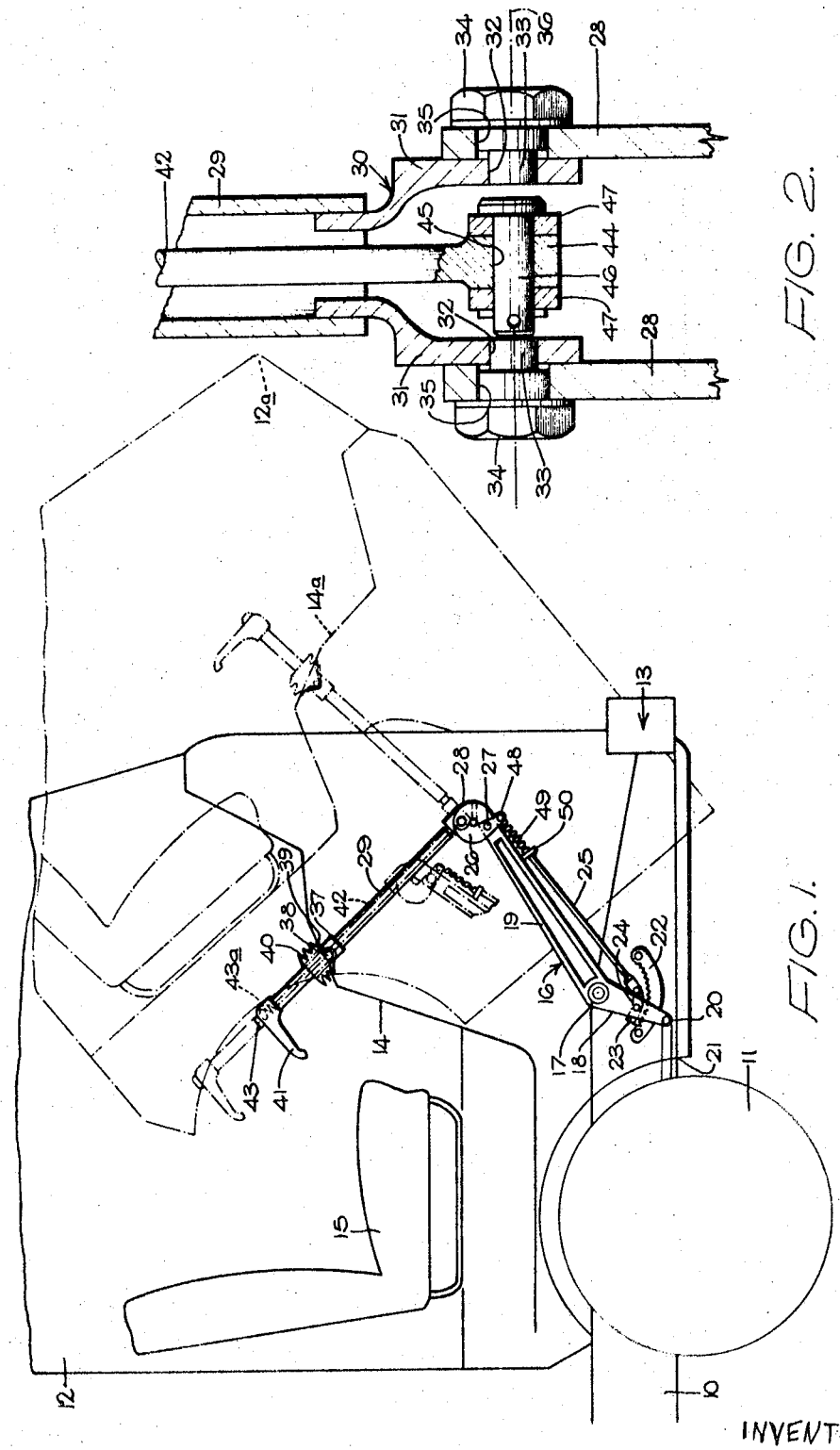

1

3,541,880
MOTOR VEHICLES
John Trevor Dudley, Brewood, England, assignor to GKN
Sankey Limited, Bilston, Stafford, England, a British
company
Filed Dec. 10, 1968, Ser. No. 782,685
Claims priority, application Great Britain, Dec. 15, 1967,
57,200/67
Int. Cl. G05g 5/12
U.S. Cl. 74—503                                   5 Claims

ABSTRACT OF THE DISCLOSURE

The disclosure describes a motor vehicle with a tilting cab in which the brake mechanism comprises a first lever pivoted to the vehicle chassis and connected to the vehicle brakes and a second lever pivoted to the first, carrying an operating handle for release means associated with the first, and pivotally and slidably mounted on the cab.

BACKGROUND OF THE INVENTION

Field of the invention

The invention relates generally to brake-operating means for motor vehicles.

Description of the prior art

At the present time, one of two arrangements is commonly used for hand brakes on tilting-cab vehicle in which the engine is mounted within or under, or partly within and partly under the cab. In a first arrangement the hand brake is fixed to the chassis and the floor or other part of the tilting cab has a slot through which the hand brake projects and is provided with a draught excluder associated with the slot and which seats around the hand brake when the cab is in its normal operative position. This draught excluder has to be comparatively large so as to give clearance to the hand brake as the cab tilts and in practice to secure satisfactory sealing the arrangement becomes comparatively complicated. The second arrangement which has been used is to operate the brake lever which is mounted on the chassis through a remote handle which is connected to the lever through a cable. Considerable force has to be used to pull on the brakes of large commercial vehicles and cables are inefficient to such an extent that there may be a frictioned loss of up to 30% of the effort applied to the remote handle. For this reason cables are, where possible, avoided where comparatively large forces are involved.

SUMMARY OF THE INVENTION

It is an object of the present invention to provide a motor vehicle having a tilting cab with a hand brake mechanism which overcomes, or substantially reduces the effect of, the above mentioned problems.

According to the invention we provide a motor vehicle including a chassis, a cab arranged to tilt relative to the chassis, a first, rigid, brake-operating lever pivotally mounted on the chassis and connected to the vehicle brakes, spring-loaded pawl and ratchet means associated with said lever and arranged to hold the lever in a given position until released, a second, rigid, brake-operating lever slidably and pivotally mounted on the cab and associated with an operating handle, a pivotal connection between the two levers and release means carried by the levers and operable from adjacent the handle to release the pawl and ratchet means.

The invention uses two rigid brake-operating levers which are pivoted together so that the cab may be tilted

2 without disturbing the setting of the first brake-operating lever, the second brake-operating lever rotating relative to the first brake-operating lever during said tilting and also pivoting and sliding relative to the cab. It is apparent that pivotal and sliding mounting of the second brake-operating lever is designed so as to accommodate the required movement of the second brake-operating lever.

Preferably, the release means comprises a release lever pivoted to the first brake-operating lever, linked to the pawl and pivotally conncted to a rigid, elongated release member lying adjacent to or within the second brake-operating lever and movable from adjacent the handle, the pivotal axis of the pivotal connection between the release lever and the release member when the pawl and ratchet means are engaged being substantially co-incident with the pivot axis of the pivotal connection between the first and second brake-operating levers. Thus, the release means is preferably formed of rigid levers and, since the release means can also pivot about the pivotal axis between the two brake-operating levers as the cab is tilted there is no tendency for the pawl and ratchet to become disengaged. As a result, the cab can be tilted either when the vehicle brakes are applied or when they are released. It may be required to tilt the cab when the brakes are released in order, for example, to adjust the brakes.

Preferably, the second brake-operating lever is in the form of a tube and the elongated release member lies within the tube. Preferably the tube itself slides in a sleeve which is pivotally mounted on the cab. The sleeve may have a gaiter of flexible material to seal the gap between the cab and the sleeve. In an alternative, but less preferred arrangement, the release meaňs may comprise a cable which is linked with the pawl and operable to release the pawl and ratchet means.

BRIEF DESCRIPTION OF THE DRAWINGS

The invention will now be described in detail by way of example with reference to the accompanying drawings in which:

FIG. 1 is a side elevation of the front part of a vehicle having a tilting cab showing the brake mechanism in a number of different positions;

FIG. 2 is a detail section, on a larger scale, showing the pivotal connection between the brake-operating levers and the release members.

DESCRIPTION OF THE PREFERRED EMBODIMENT

Referring now to the drawings, the front part of the chassis of the motor vehicle is indicated at 10 and one of the front wheels at 11. The vehicle has a cab, part of which is indicated at 12, the cab being pivotally mounted at 13 to the chassis and movable between the full line position shown in FIG. 1 and the tilted position shown in dash lines in FIG. 1. The cab includes an engine cover 14 and carries the driver's seat 15 so that both cover and seat tilt with the cab.

The brake mechanism comprises a first brake-operating lever 16 which is pivoted at 17 to the chassis 10, the lever 16 is in the form of a bell-crank having arms 18 and 19. The arm 18 is pivoted at 20 to the vehicle brake linkage, part of which is indicated at 21.

A ratchet 22 is secured to the chassis 10 and is engaged by a pawl 23, the pawl being pivoted at 24 to the arm 18. The pawl is connected by a release member 25 to a release lever 26 which is pivoted at 27 to the arm 19 adjacent the upper end thereof.

The upper end of the arm 19 is provided with a pair of ears 28 which are spaced apart and directed rearwardly and upwardly as shown in FIG. 1. Pivotally mounted between the ears 28 is a second brake operating lever 29 which is in the form of a tube. The pivotal connection between these levers is clearly shown in FIG. 2 and it will be seen that the lower end of the second brake operating lever 29 has secured therein a fitting 30 which has spaced lugs 31 which fit within the ears 28. Each lug 31 is provided with a bearing aperture 32 and receives the plain end 33 of a pivot pin 34, the pivot pins being threadably engaged at 35 in the ears 28. The axis of pivotal connection between the brake-operating levers 16 and 29 is indicated by the line 36.

The brake-operating lever 29 is slidably engaged in a tube 37 which is pivotally mounted at 38 in a slot 39 in the engine casing 14, the slot being of sufficient dimensions to allow the tube 37 to rock. The brake-operating lever 29 is a comparatively close sliding fit in the tube 37 and the upper end of the tube 37 is connected to a flexible gaiter 40, the lower end of which is secured to the engine casing 14 around the slot 39. The upper end of the brake-operating lever 29 is provided with a handle 41.

A release means for releasing the pawl and ratchet 22, 23, comprises, in addition to the release member 25 and release lever 26, a further release member 42 which is received within the brake-operating lever 29 and terminates at its upper end in a spring-loaded push-button 43 operated on by a spring 43a and mounted in the handle 41. The lower end 44 of the release member 42 is provided with an aperture 45 (see FIG. 2) in which is received a clevis pin 46 which also passes through a clevis formed by ears 47 on the upper end of the release lever 26. The lower end of the release lever 26 is pivoted at 48 at the upper end of the release member 25 and a spring 49 is interposed between the lower end of the release lever and an apertured stop 50 on the arm 19, the release member 25 passing through the stop 50. It will be apparent that the spring 49 urges the pawl 23 into engagement with the ratchet 22 by urging the release lever 26 in an anti-clockwise direction in FIG. 1. When the parts are in the positions shown with the pawl and ratchet 22, 23 engaged, the axis of the pin 46 is coincident with the axis 36.

The brake mechanism is shown in the "off" position in full lines in FIG. 1. If it is desired to apply the brakes, the push button 43 is depressed and this pivots the release lever 26 in a clockwise sense about the pivot 27, thus moving the release member 25 downwardly and pivoting the pawl in a clockwise direction to release it from the ratchet 22. The handle 41 can then be pulled, thus rotating the first brake-operating lever 16 about its pivot 17 through the second brake operating lever 29 and the pivotal connection between the two brake-operating levers. During the movement of the second brake-operating lever 29 it slides through the tube 37 which by virtue of its pivotal connection can accommodate any required change in attitude of the brake-operating lever. The upper end of the second brake-operating lever 16 and the handle 41 and the upper end of the brake-operating lever 29 are shown in chain lines in FIG. 1.

If it now be assumed that the brakes are in their "off" position and the mechanism in the position shown in full lines in FIG. 1, the cab may be tilted from the full line position shown to the position shown in dash lines. It will be seen that during this movement the engine casing 14 moves to the position indicated at 14a in FIG. 1 and the cab as a whole moves to the position indicated at 12a in that figure. The setting of the first brake-operating lever is undisturbed during this pivoting of cab for the following reason. The second brake-operating lever 29 can pivot relative to the first brake-operating lever about the pivot pins 34. The second brake-operating lever 29 can also slide in the tube 37 and the latter can pivot at 38 relative to the engine casing 14. Pivoting of the casing, therefore, does not affect the setting of the brake-operating lever 16 through the brake-operating lever 29. Moreover, the pivotal axis of connection between the brake release member 42 and the release lever 26 when the pawl and ratchet are engaged, is on the axis 36 of pivotal connection between the brake operating lever 29 and the brake-operating lever 19. It follows that pivotal movement of the second brake-operating lever 29 relative to the first brake-operating lever 16 will not disturb the release mechanism either so there will be no tendency for the pawl and ratchet 23, 22 to become disengaged.

It will be appreciated that the cab could have been tilted to the position at 12a with the brake in its "on" position, in which case the engagement of the pawl and ratchet would be at the right-hand end of the ratchet 22 in FIG. 1 and the upper end of the first brake-operating arm 16b in the position shown in chain lines in FIG. 1. It will be appreciated that the dimensions of the slot 39 through which the tube 37 passes will be such as to allow appropriate rocking movement of the tube 37 during pivoting of the cab.

It is preferred that the release means for the pawl and ratchet 22, 23 is as described and comprises rigid release members 42 and 25 pivotally connected through a release lever 26. However, in a modified arrangement the release means may comprise a cable which is operable from a push-button or a grip on handle 41 to release the pawl and ratchet.

What is claimed is:

1. A motor vehicle including a chassis, a cab tiltably mounted on the chassis, a first, rigid, brake-operating lever pivotally mounted on the chassis and connected to the vehicle brakes, spring-loaded pawl and ratchet means associated with said lever and arranged to hold the lever in a given position until released, a second, rigid, brake-operating lever slidably and pivotally mounted on the cab, an operating handle associated with said second lever, a pivotal connection between the two levers and release means carried by the levers and operable from adjacent the handle to release the pawl and ratchet means.

2. A vehicle according to claim 1, wherein the release means comprise a release lever pivoted to the first, brake-operating lever and linked to the pawl, a rigid elongated release member lying parallel with the second brake-operating lever, pivotally connected to said release lever and movable from adjacent the handle, the pivotal axis of the pivotal connection between the release lever and the release member when the pawl and ratchet means are engaged being substantially coincident with the pivot axis of the pivotal connection between the first and second brake-operating levers.

3. A vehicle according to claim 2, wherein the second brake-operating lever is in the form of a tube and the elongated release member lies within said tube.

4. A vehicle according to claim 3, including a sleeve which is pivotally mounted on a cab, the tube being slidable in said sleeve.

5. A vehicle according to claim 4, including a gaiter of flexible material interposed between the sleeve and the cab to seal the gap therebetween.

References Cited

UNITED STATES PATENTS

| 2,669,884 | 2/1954 | Sandberg | 74—503 |
| 2,671,353 | 3/1954 | Hinsey | 74—503 |

FRED C. MATTERN, Jr., Primary Examiner

F. D. SHOEMAKER, Assistant Examiner